United States Patent
Coulton et al.

(10) Patent No.: US 8,387,336 B2
(45) Date of Patent: Mar. 5, 2013

(54) WATER-RESISTIVE BARRIER, EXTERIOR WALL OR ROOF ASSEMBLY, AND METHOD OF APPLYING THE BARRIER

(75) Inventors: Michael S. Coulton, North Wales, PA (US); Geoffrey N. Ehrman, Doylestown, PA (US)

(73) Assignee: Benjamin Obdyke Incorporated, Horsham, PA (US)

( * ) Notice: Subject to any disclaimer, the term of this patent is extended or adjusted under 35 U.S.C. 154(b) by 659 days.

(21) Appl. No.: 12/188,350

(22) Filed: Aug. 8, 2008

(65) Prior Publication Data

US 2009/0038249 A1 Feb. 12, 2009

Related U.S. Application Data

(60) Provisional application No. 60/954,943, filed on Aug. 9, 2007.

(51) Int. Cl.
*E04G 21/00* (2006.01)

(52) U.S. Cl. ............... 52/741.4; 52/409; 52/60; 52/416

(58) Field of Classification Search ............... 52/58, 60, 52/72, 94, 96, 198, 409, 416, 518, 741.4, 52/408, 415; 427/208; 428/343, 354; 156/71
See application file for complete search history.

(56) References Cited

U.S. PATENT DOCUMENTS

| | | | | |
|---|---|---|---|---|
| 2,149,818 A * | 3/1939 | North | .............................. | 52/409 |
| 3,032,181 A * | 5/1962 | Hutter et al. | .................... | 428/192 |
| 4,082,882 A * | 4/1978 | Weinstein et al. | ............. | 442/286 |
| 4,088,805 A * | 5/1978 | Wiegand | ......................... | 442/370 |
| 4,157,410 A * | 6/1979 | McClintock | ................. | 428/40.6 |
| 4,421,807 A * | 12/1983 | Clausing et al. | ............. | 428/40.3 |
| 4,751,122 A * | 6/1988 | May | .............................. | 428/40.3 |
| 4,757,652 A * | 7/1988 | Kalkanoglu | ..................... | 52/420 |
| 4,815,892 A * | 3/1989 | Martin | .............................. | 405/45 |
| 5,091,235 A | 2/1992 | Vergnano | | |
| 5,099,627 A | 3/1992 | Coulton et al. | | |
| 5,142,837 A * | 9/1992 | Simpson et al. | ................. | 52/409 |
| 5,374,477 A | 12/1994 | Lawless et al. | | |
| 5,428,931 A * | 7/1995 | Ragsdale | .......................... | 52/518 |
| 5,593,771 A | 1/1997 | Lawless et al. | | |
| 5,737,897 A | 4/1998 | Naipawer, III | | |
| 5,881,521 A * | 3/1999 | Porter et al. | ..................... | 52/417 |
| 5,895,301 A | 4/1999 | Porter et al. | | |
| 6,004,645 A * | 12/1999 | Hubbard | .......................... | 428/57 |
| 6,023,906 A | 2/2000 | Folkersen | | |
| 6,052,961 A * | 4/2000 | Gibbs | .............................. | 52/518 |
| 6,131,353 A | 10/2000 | Egan | | |
| 6,256,956 B1 * | 7/2001 | Davis | .............................. | 52/408 |
| 6,279,284 B1 * | 8/2001 | Moras | .............................. | 52/408 |
| 6,355,333 B1 * | 3/2002 | Waggoner et al. | ............. | 428/174 |
| 6,378,259 B1 | 4/2002 | Carlson | | |
| 6,401,401 B1 * | 6/2002 | Williams | ............................ | 52/58 |
| 6,425,213 B1 * | 7/2002 | Lachapelle | ................. | 52/169.14 |
| 6,426,129 B1 * | 7/2002 | Kalwara et al. | .............. | 428/41.8 |
| 6,506,466 B1 * | 1/2003 | Sieber et al. | .................. | 428/40.1 |
| 6,550,212 B2 * | 4/2003 | Lubker, II | ................. | 52/741.13 |

(Continued)

*Primary Examiner* — William Gilbert
*Assistant Examiner* — James Ference
(74) *Attorney, Agent, or Firm* — Howson & Howson LLP

(57) ABSTRACT

A method of assembling an exterior wall or roof structure of a building with a water-resistive barrier includes covering a surface of an inner sheathing member of a wall or roof structure with a series of partially overlapping courses of water-resistive sheet material. Each overlapping section of the courses of water-resistive sheet material is bonded together with a continuous strip of adhesive to form an air-tight seam. The strip of adhesive is carried integrally on the water-resistive sheet material thereby eliminating a need for separately applying construction tape to seal the seams. A water-resistive barrier and assembly of an exterior wall or roof assembly of a building is also provided.

7 Claims, 3 Drawing Sheets

U.S. PATENT DOCUMENTS

| | | |
|---|---|---|
| 6,594,965 B2 | 7/2003 | Coulton |
| 6,701,685 B2 | 3/2004 | Rippey |
| 6,761,006 B2 * | 7/2004 | Lubker, II .................... 52/302.1 |
| 6,786,013 B2 | 9/2004 | Coulton |
| 6,804,922 B1 | 10/2004 | Egan |
| 6,848,220 B2 * | 2/2005 | Faurholdt et al. ................. 52/58 |
| 6,901,712 B2 | 6/2005 | Lionel |
| 7,175,732 B2 * | 2/2007 | Robison et al. ............... 156/271 |
| 7,178,306 B2 * | 2/2007 | Fritz .......................... 52/746.11 |
| 7,198,220 B2 * | 4/2007 | Knowlton ................. 242/530.2 |
| 7,685,785 B2 * | 3/2010 | Johnson .......................... 52/409 |
| 7,776,177 B2 * | 8/2010 | Hubbard ..................... 156/300 |
| 2001/0010141 A1 * | 8/2001 | Folkersen ................. 52/746.11 |
| 2002/0121061 A1 * | 9/2002 | Rippey ............................ 52/408 |
| 2003/0005658 A1 * | 1/2003 | Folkersen ...................... 52/408 |
| 2003/0068457 A1 * | 4/2003 | McCain ....................... 428/40.1 |
| 2003/0074854 A1 * | 4/2003 | Nordgren et al. .......... 52/506.01 |
| 2003/0230035 A1 * | 12/2003 | Collins et al. .................... 52/209 |
| 2004/0016201 A1 * | 1/2004 | Folkersen .................... 52/741.4 |
| 2004/0103608 A1 * | 6/2004 | Lionel .............................. 52/408 |
| 2004/0180195 A1 * | 9/2004 | Macuga ........................ 428/343 |
| 2005/0011140 A1 * | 1/2005 | Ackerman et al. ................. 52/58 |
| 2005/0032447 A1 * | 2/2005 | Tachibana et al. ............. 442/149 |
| 2005/0106387 A1 * | 5/2005 | Ishikawa et al. .............. 428/354 |
| 2005/0214496 A1 * | 9/2005 | Borenstein ................... 428/40.1 |
| 2005/0229504 A1 * | 10/2005 | Bennett et al. .................. 52/105 |
| 2006/0005494 A1 * | 1/2006 | Marshall et al. ........... 52/506.01 |
| 2006/0010788 A1 * | 1/2006 | Nettleton .......................... 52/58 |
| 2006/0096218 A1 * | 5/2006 | Johnson ..................... 52/506.01 |
| 2006/0141191 A1 * | 6/2006 | Seth et al. ..................... 428/40.1 |
| 2006/0174546 A1 * | 8/2006 | Kim .................................. 52/63 |
| 2007/0014956 A1 * | 1/2007 | McCarthy ..................... 428/40.1 |
| 2007/0044409 A1 * | 3/2007 | Anderson ....................... 52/518 |
| 2007/0051069 A1 | 3/2007 | Grimes |
| 2007/0175107 A1 * | 8/2007 | O'Rourke ......................... 52/58 |
| 2008/0041005 A1 | 2/2008 | Ehrman et al. |

* cited by examiner

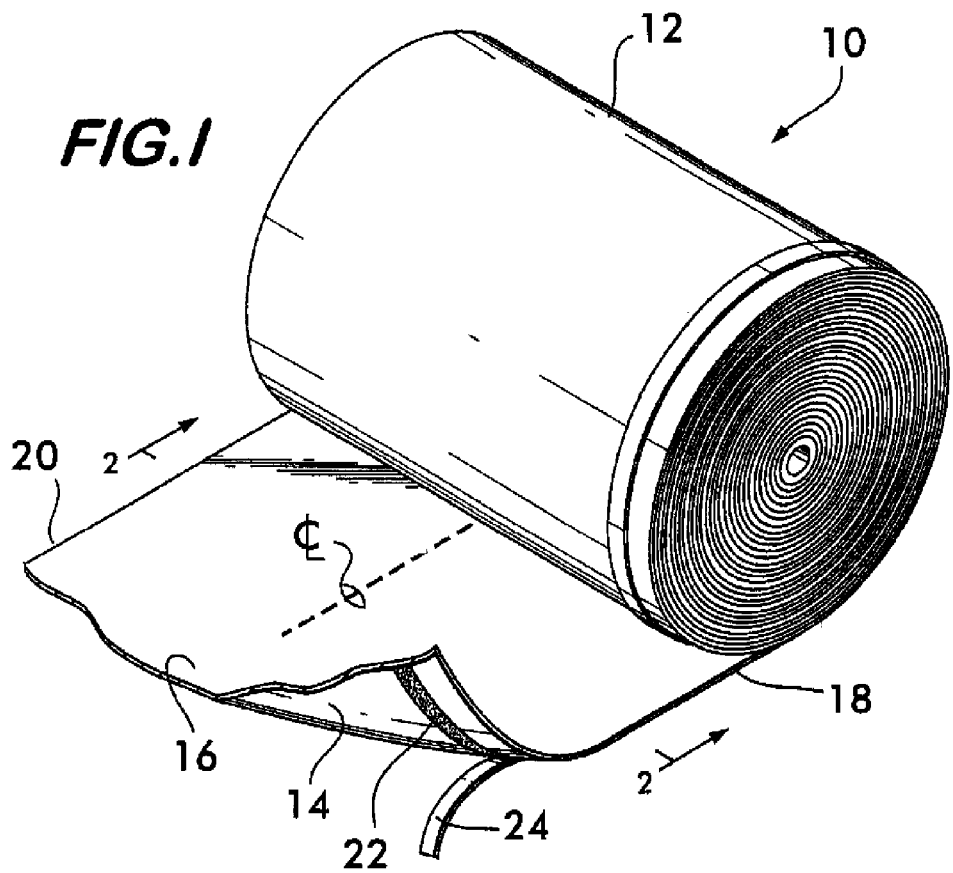
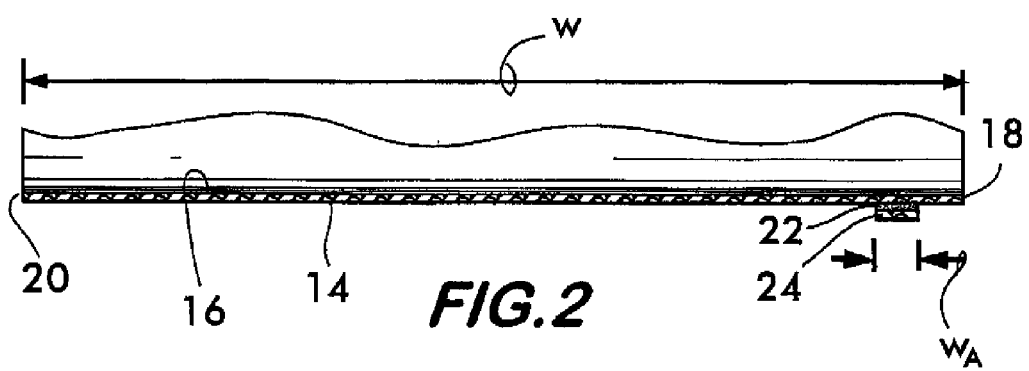

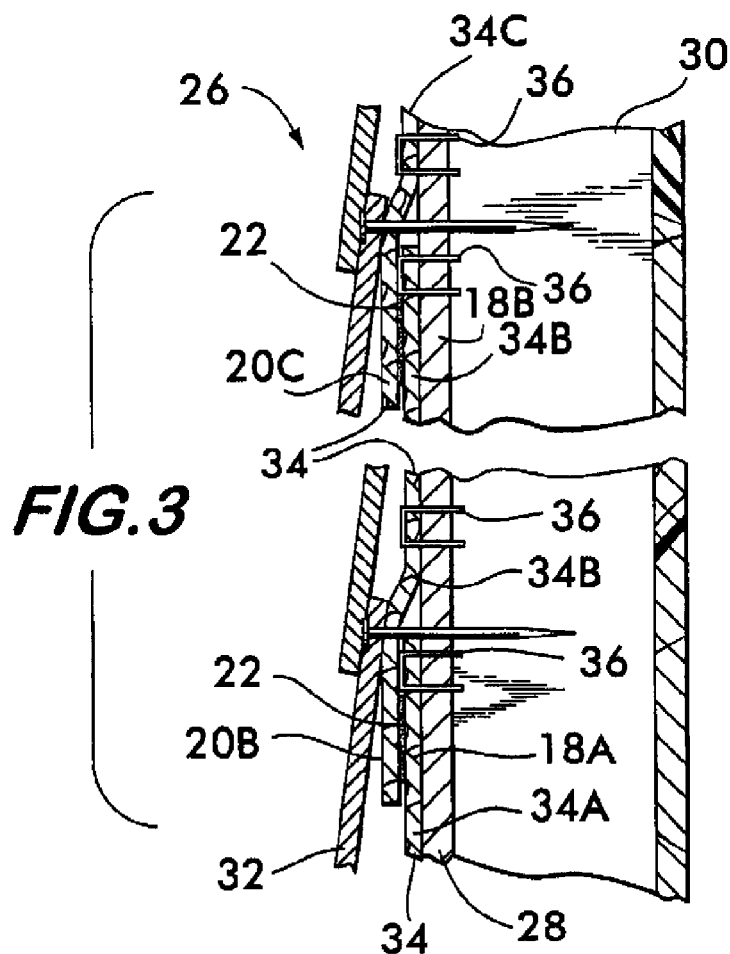
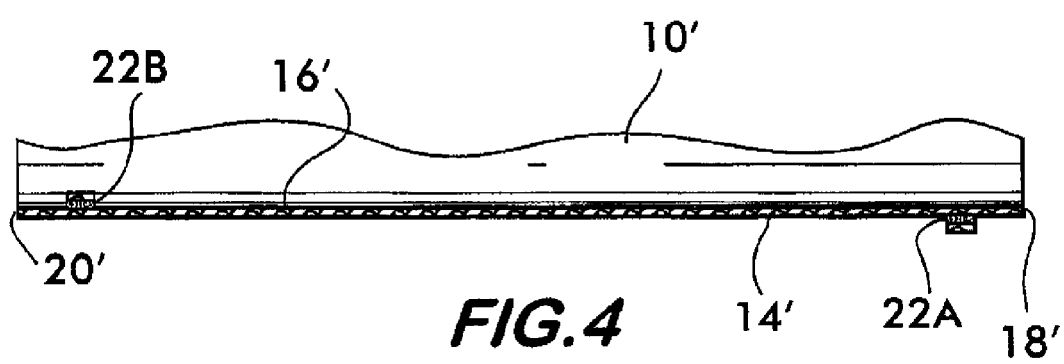

WATER-RESISTIVE BARRIER, EXTERIOR WALL OR ROOF ASSEMBLY, AND METHOD OF APPLYING THE BARRIER

CROSS-REFERENCE TO RELATED APPLICATIONS

This application claims the benefit under 35 USC §119(e) of U.S. Provisional Patent Application No. 60/954,943, filed Aug. 9, 2007.

BACKGROUND OF THE INVENTION

The present invention relates to a wrap, membrane, or like sheet material for forming a water-resistive barrier within an exterior wall and/or roof of a building to protect the building from water or moisture penetration, and more particularly, the present invention relates to a water-resistive barrier and method of applying the barrier whereby all seams and/or edges are sealed tight to ensure optimum performance of the barrier.

When constructing or renovating a building, it is conventional practice to cover inner sheathing members of exterior walls or roof decks with a water-resistive barrier before windows, doors, or like construction elements and/or exterior siding or like coverings are installed. The water-resistive barrier is typically a layer of building paper, tar paper, roofing felt, house-wrap, or like membrane capable of forming a barrier layer about the building to prevent the penetration of air and/or water into the building through the barrier.

Some water-resistive barriers permit moisture vapor transmission so that moisture vapor present within the building can escape through the barrier layer. This prevents moisture vapor from being trapped within a wall cavity behind the barrier layer. Moisture vapor transmission is typically provided by house-wraps made of thermoplastic materials. Examples of thermoplastic house-wrap materials include TYPAR housewrap sold by BBA Fiberweb and TYVEK housewrap sold by Dupont.

The presence of a water-resistive barrier layer can also reduce air leaks through the walls and/or roofs of the building and may enable reductions in costs to heat and cool the building, for instance, by as much as 25% to 40%. Further, sealing the seams and edges of the barrier layer with the separate application of a construction tape or the like has been found to improve a house-wrap's performance by approximately 20% as compared to a barrier layer with unsealed seams and edges. For at least this reason, it is preferable to seal the seams and edges of the barrier layer with the separate application of a construction tape to ensure that moisture and air cannot penetrate the barrier layer through cracks and seams. Typically, the construction tape is an elongate strip of polypropylene film coated with an all-weather acrylic adhesive that forms a strong bond at the seams and edges of the barrier layer.

Accordingly, there is a need for a wrap, membrane, or the like that can be applied in a manner ensuring that all seams are sealed tight and prevent water and air infiltration through the barrier layer. A method of installing the barrier layer should enable ready application of a water-resistive barrier having tightly sealed seams and/or edges. The installation should require only a minimum of skill and labor, and the wrap should be capable of efficient and inexpensive manufacture.

BRIEF SUMMARY OF THE INVENTION

More specifically, the present invention provides a method of assembling an exterior wall or roof structure of a building with a water-resistive barrier. A surface of an inner sheathing member of a wall or roof structure is covered with a series of partially overlapping courses of water-resistive sheet material, and each overlapping section of the courses of water-resistive sheet material is bonded together with a continuous strip of adhesive. The strip of adhesive is carried integrally on the water-resistive sheet material, and thus, the step of applying the sheet material simultaneously accomplishes the step of applying the adhesive. The strip of adhesive is used to form air-tight seams and thereby eliminates the need for separately applying construction tape to seal the seams.

Preferably, the water-resistive sheet material is provided in a spiral roll and is unrolled before or during a step of securing the water-resistive barrier to the inner sheathing member. The strip of adhesive is carried integrally on the water-resistive sheet material in the spiral roll, and a peel-away release sheet covers the strip of adhesive within the spiral roll. The method includes a step of removing the release sheet before forming the air tight seams with the exposed strip of adhesive.

Preferably, the strip of adhesive is a narrow continuous strip of adhesive extending longitudinally on a face of the water-resistive sheet material closely spaced to one of the longitudinally-extending side edges of the water-resistive material. The series of partially overlapping courses of water-resistive sheet material are arranged such that the strips of adhesive are sandwiched between the overlapping sections of the courses of water-resistive material. For example, the strip of adhesive can be closely spaced to a lower edge of each of the courses and face inward toward the inner sheathing member or can be closely spaced to an upper edge of each of the courses facing in a direction away from the inner sheathing member.

In addition, preferably the courses of water-resistive sheet material are secured to the inner sheathing member with fasteners, such as staples or the like, and the method includes the steps of lifting a lower edge of one of the courses upward after the fasteners are applied and peeling away a release sheet from the strip of adhesive to expose the strip of adhesive. Thereafter, the upwardly lifted lower edge is returned to a position where it confronts and overlaps an upper edge of an adjacent underlying course of water-resistive material so that the exposed strip of adhesive is sandwiched between the overlapping lower and upper edges and forms an air-tight seal.

According to other aspects of the present invention, a wall or roof assembly of a building and a water-resistive barrier are provided. Both include a water-resistive sheet material, such as a housewrap, having an integral strip of adhesive for use in forming air-tight seals at the seams of a barrier layer formed with the water-resistive material.

BRIEF DESCRIPTION OF THE DRAWINGS

The features and advantages of the present invention should become apparent from the following description when taken in conjunction with the accompanying drawings, in which:

FIG. 1 is a perspective view of a spiral roll of a wrap or membrane according to the present invention;

FIG. 2 is a cross-sectional view of the wrap taken along line 2-2 of FIG. 1;

FIG. 3 is a cross sectional view of an exterior wall assembly of a building according to the present invention;

FIG. 4 is a cross-sectional view of an alternate embodiment of a wrap or membrane according to the present invention.

DETAILED DESCRIPTION OF THE INVENTION

Figure 5:
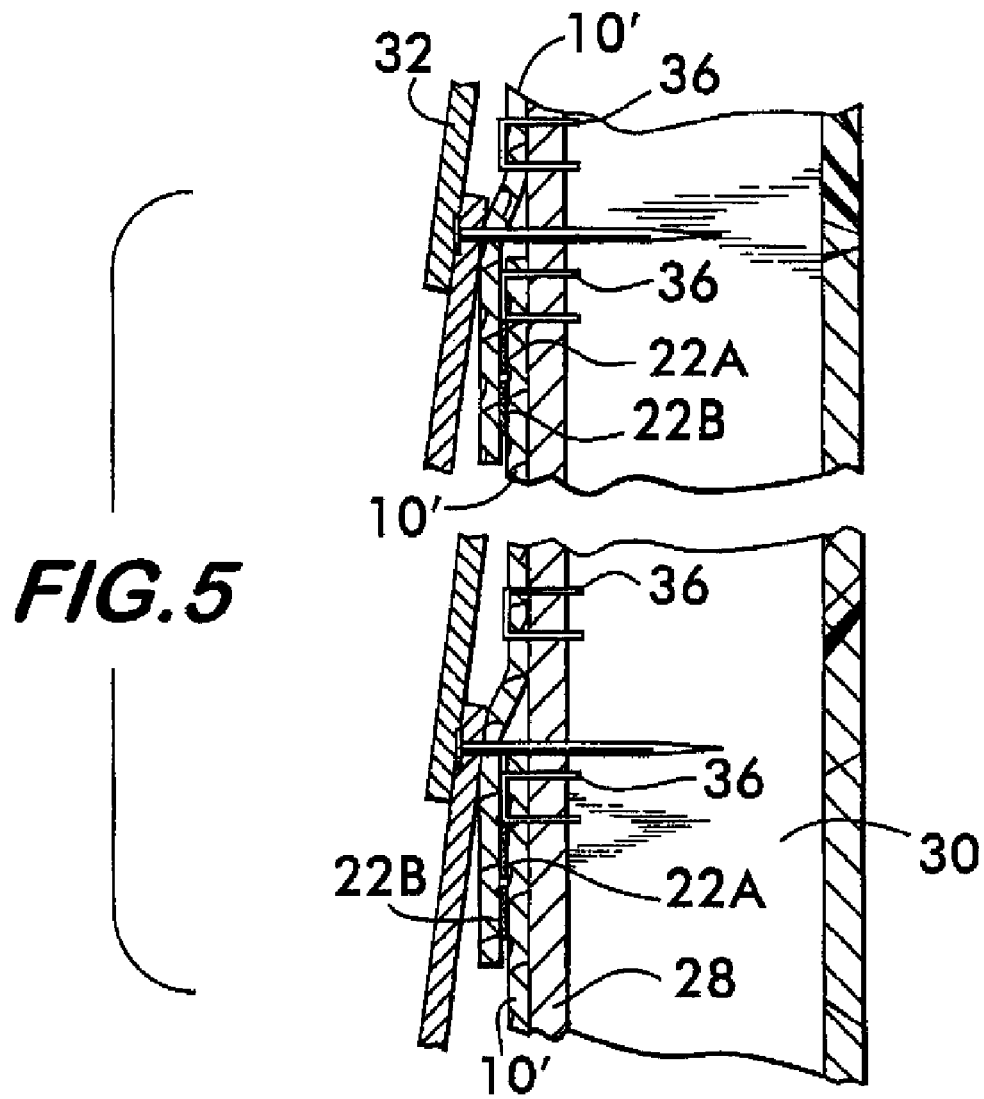
FIG. 5 is a cross sectional view of an exterior wall assembly of a building utilizing the alternate embodiment.

Referring now to the drawings, FIGS. 1 and 2 illustrate a first embodiment of an elongate, continuous, indeterminate length strip of water-resistive sheet material, or wrap, 10 according to the present invention. The water-resistive sheet material 10 is preferably stored and shipped in roll form, such as the spiral roll 12 shown in FIG. 1, and is unrolled and applied as a barrier layer or covering on inner sheathing members of an exterior wall or roof deck of a building. When installed within an exterior wall or roof assembly of a building, the water-resistive sheet material 10 provides a barrier to water infiltration, air infiltration, or both. In addition, some contemplated embodiments of the water-resistive sheet material 10 also permit water vapor to escape from inside the building outwardly through the sheet material 10.

Accordingly, the sheet material 10 can be made of paper, tar paper, felt, roofing felt, a polymeric material, wrap, or like membrane. If the sheet material is made of a polymeric material it is preferably a house-wrap made of a thermoplastic material, a synthetic resin, olefin resin, polyolefin polymer, polypropylene, high density polyethylene, polystyrene, nylon, PVC or the like. In addition, the sheet material 10 can be a woven material, a non-woven material, a dry-laid non-woven material, a wet-laid non-woven material, a hybrid non-woven material, a polymer-laid non-woven material, a spun-bonded non-woven material, a flash-spun non-woven material, or the like.

The sheet material 10 has opposite faces, 14 and 16, and opposite longitudinally-extending edges, 18 and 20. See FIG. 1. The width "W" of the sheet material 10 as measured transversely across the faces, 14 and 16, between opposite longitudinally-extending edges, 18 and 20, can be provided in any size or dimension. Typical dimensions for width "W" is three or four feet; however, the width "W" can be nine feet, ten feet or greater, or less than three feet. Larger sizes may be desirable since fewer rows of applied water-resistive sheet material 10 may be required for complete coverage, for instance, from foundation to roof. Alternatively, smaller sizes may be desirable if ease of handling is an issue.

A novel aspect of the present invention is that at least one strip of an adhesive is integrally provided on at least one face of the water-resistive sheet material. The adhesive strip can extend longitudinally on the sheet material, such as substantially parallel to the longitudinally-extending centerline of the sheet material, and/or can extend transversely or substantially perpendicularly across one of the faces of the sheet material at predetermined intervals. As will be discussed in greater detail below, the purpose of the adhesive strip is to form a tight seal along seams and/or edges of a barrier layer formed by a series of overlapping rows of the water-resistive sheet material. The strips of adhesive eliminate, or at least greatly reduce, the need for separately applying construction tape or the like to seal the seams and edges of a barrier layer.

According to one contemplated embodiment of the present invention as illustrated in FIGS. 1 and 2, the strip of adhesive 22 extends in a substantially straight line path in a longitudinal direction on face 14 of the sheet material 10. As illustrated, the strip of adhesive 22 extends continuously and substantially parallel to a longitudinal centerline "CL" of the sheet material 10 and is closely spaced to edge 18. FIG. 4 illustrates an example of an alternative embodiment in which a first strip of adhesive 22A extends on face 14' of sheet material 10' adjacent edge 18' and a second strip of adhesive 22B extends on the opposite face 16' adjacent the opposite edge 20'. As further alternatives, the strip of adhesive can be provided as multiple separate closely-spaced strips of adhesive, or can follow an undulating or other non-linear path. Still further, strips of adhesives can be provided that extend transversely across the sheet material at pre-determined intervals for forming seals at ends of a wrap.

By way of example, and not by way of limitation, the width "WA" of the strip of adhesive 22 can be about 1 inch to about 4 inches thereby providing a narrow strip of adhesive relative to the width "W" of the sheet material 10. Preferably, the strip of adhesive covers only about 10% or less of the surface area of the face of the water-resistive sheet material 10. The adhesive 22 can be a pressure sensitive adhesive, an all-weather acrylic adhesive, or other type of adhesive.

A peel-away release sheet 24 of wax paper or the like can be applied over the strip of adhesive 22 to cover and protect the strip of adhesive 22 before the sheet material 10 is initially rolled into the spiral roll 14 during manufacture. The strip of adhesive 22 can be of a minimal thickness several times less thick then the thickness of the sheet material 10 itself. The thickness of the adhesive 22 illustrated in the drawings is exaggerated merely for ease of illustration purposes.

An assembly 26 in which the above referenced wrap 10 is utilized to form a barrier layer is illustrated in FIG. 3. The assembly 26 is of an exterior wall of a building; however, such an assembly can also be utilized for an exterior roof or other structure (not shown) of a building. The typical assembly 26 includes inner sheathing members 28 affixed to support posts 30 of the building. The inner sheathing members 28 are typically formed of panels of plywood, oriented strand board, particle board, insulated concrete, or other materials permitted by local building codes.

During construction of the assembly 26, the sheet material, or wrap, 10 is applied as a series of separate overlapping rows, or courses, 34 to the exposed outward facing surface of the inner sheathing members 28 such that the wrap 10 forms a barrier layer covering substantially all outward facing surfaces of the inner sheathing members 28. Typically, the wrap 10 is applied to the inner sheathing members 28 before windows, doors, or like building components (not shown) are installed and before exterior siding 32 or like exterior covering is installed.

Preferably, each row or course 34 of the wrap 10 is applied such that its longitudinal centerline extends substantially horizontal. As an example, a first row is applied adjacent and along the foundation of the building, and each successive row is applied thereabove with a pre-determined amount of overlap. For an exterior wall assembly, the series of horizontally-extending rows 34 of wrap 10 are applied from the foundation to the roof line of the building so that a continuous water-resistive barrier layer is formed throughout the full height of all exterior walls of the building.

By way of example, a section of an exterior wall assembly 26 is illustrated in FIG. 3 in which portions of three separate rows, 34A, 34B and 34C, of the wrap 10 are shown. An upper edge 18A of the lower row 34A is secured to the inner sheathing member 28 such that a lower edge 20B of the intermediate row 34B overlaps upper edge 18A. In turn, an upper edge 18B of the intermediate row 34B is overlapped by a lower edge 20C of the upper row 34C. Fasteners 36, such as staples or the like, are used to secure each row, 34A, 34B and 34C, of wrap 10 to the inner sheathing member 28.

Within the assembly 26, the integral continuous strips of adhesive 22 are located such that they are sandwiched between the overlapping sections of the rows 34 of wrap 10. For example, a strip of adhesive 22 is located between the confronting faces of the upper edge 18A and the lower edge 20B, and a strip of adhesive 22 is located between the confronting faces of the upper edge 18B and the lower edge 20C. See FIG. 3. The strips of adhesive 22 seal the seams of the barrier layer within each overlapping section of the rows 34 of wrap 10 thereby preventing air and water infiltration through the seams. Thus, the separate application of construction tape or the like is not required to seal the seams of the barrier layer.

After the wrap 10 is applied, an exterior covering 32 is applied over the barrier layer to finish the exterior wall or roof of the building. The exterior covering 32 can be, for instance, a wood or fiber-cement siding product, wooden shingles, cedar shakes, brick, stone, stucco, an exterior insulation finish system (EIFS), vinyl, metal, asphalt, rubber, thermoplastic, and other exterior siding and roofing materials. An openwork spacer, furring strips, or like rainscreen product (not shown) can be applied between the wrap 10 and the exterior covering 32; alternatively, the wrap 10 can be provided with integrally formed spacers or the like (not shown) to provide drainage and ventilation passageways within the wall or roof cavity.

The method of installing the wrap 10 includes unrolling the wrap 10 from the spiral roll 12 and affixing a series of horizontally-extending, partially-overlapping rows, or courses, 34 of the wrap 10 to the inner sheathing members 28. A wrap 10 such as illustrated in FIGS. 1 and 2 can be installed such that face 16 of the wrap 10 confronts the inner sheathing member 28 and face 14 of the wrap 10 faces outward and is exposed. The edge 14 of the wrap 10 forms the upper edge of each row 34 so that the strip of adhesive 22 faces outward adjacent the upper edge of each row 34 of wrap 10. Alternatively, the wrap 10 can be applied such that face 14 of the wrap 10 faces the inner sheathing members 28 and the edge 14 forms the lower edge of each row 34. In either arrangement, the strip of adhesive 22 will be properly located directly between overlapping sections of the wrap 10.

Preferably, fasteners 36 are applied to separately affix each row 34 of wrap 10 to the inner sheathing member 28. The fasteners 36 may include staples, tacks, nails, or other headed fasteners. The fasteners 36 are applied such that a lower edge of each row 34 can be lifted up to expose and permit access to the release sheets 24 covering the strips of adhesive 22. As an example, see lower edges 20B and 20C relative to fasteners 36 in FIG. 3. This arrangement permits the lower edges, 20B and 20C, to be folded or pivoted upward so that the release sheets 24 can be readily accessed and removed thereby exposing the strips of adhesive 22.

Depending upon the arrangement of the applied wrap 10, the strip of adhesive 22 may be provided adjacent the lower edge of an upper course of wrap or adjacent the upper edge of a lower course of wrap. When the lower edge is folded down such that it confronts and overlaps the adjacent row of wrap, the exposed strip of adhesive 22 is sandwiched between the overlapping sections of the adjacent rows of wrap. Pressure can be applied with a tool or by hand along the length of the overlap to ensure that a water and air tight bond is formed between the overlapping sections of the wrap. This process can be used to seal all seams formed by overlapping sections of the wrap. Accordingly, the strip of adhesive 22 carried by the wrap 10 eliminates the need for a separate application of construction tape, at least with respect to the seams of the barrier layer formed by overlapped sections of the wrap 10.

As an alternative, the release sheets 24 can be removed during the step of securing a course 34 of wrap 10 to the inner sheathing members 28 or can be removed before an overlapping course of wrap is applied to the sheathing members 28. Other arrangements of the wrap and strips of adhesive can also be utilized. For example, the wrap 10' shown in FIG. 4 can be utilized in which both the upper and lower edges of each row of wrap include a strip of adhesive 22A and 22B. Accordingly, the rows can be applied such that a pair of strips of adhesive will be present within each overlapping section of the barrier layer. See FIG. 5.

Thus, the above-described wrap, wall and roof assemblies, and method of assembling a barrier layer according to the present invention provide a cost effective and efficient manner of providing a building structure with a sealed barrier layer.

While preferred wraps, assemblies, and methods have been described in detail, various modifications, alterations, and changes may be made without departing from the spirit and scope of the present invention as defined in the appended claims.

The invention claimed is:

1. A method of assembling an exterior wall of a building with a water-resistive barrier, comprising the steps of:
    covering a surface of an inner sheathing member of a wall structure with a series of partially overlapping courses of water-resistive sheet material, the water-resistive sheet material in each of the courses being a vapor permeable building wrap material and having an inner face confronting the inner sheathing member, an opposite outer face facing away from the inner sheathing member, an upper longitudinally-extending edge, and a lower longitudinally-extending edge, and said covering step including forming a barrier layer from a foundation to a roof of the building on all exterior walls of the building such that the barrier layer includes an alternating array of overlapping sections of the courses of water-resistive material and non-overlapping sections of the courses of water-resistive material;
    fastening the courses of water-resistive sheet material to the inner sheathing member with fasteners; and
    bonding each overlapping section of the courses of water-resistive sheet material with adhesive carried integrally on the water-resistive sheet material to form air-tight seams for all seams of the barrier layer;
    the inner face of the water-resistive sheet material in each of the courses having the integrally-carried adhesive in a form of a narrow continuous strip of adhesive extending longitudinally on the inner face closely spaced to the lower longitudinally-extending edge, less than 10% of the surface area of the inner face being covered by the integrally-carried adhesive;
    the outer face of the water-resistive sheet material in each of the courses having the integrally-carried adhesive in a form of a narrow continuous strip of adhesive extending longitudinally on the outer face closely spaced to the upper longitudinally-extending edge, less than 10% of the surface area of the outer face being covered by the integrally-carried adhesive; and
    said covering step including arranging the series of partially overlapping courses of water-resistive sheet material such that the strips of adhesive on the inner and outer faces are sandwiched between the overlapping sections of the courses of water-resistive material and such that all the integrally-carried adhesive is located only between the overlapping sections of the courses of water-resistive material to maximize vapor permeability at the non-overlapping sections of the courses of water-resistive material.

2. A method according to claim 1, further comprising the step of unrolling the water-resistive sheet material from a spiral roll before or during said covering step, wherein the continuous strips of adhesive are carried integrally on the water-resistive sheet material in the spiral roll.

3. A method according to claim 2, wherein peel-away release sheets cover the strips of adhesive in the spiral roll, and further comprising the step of removing the release sheets before said bonding step.

4. A method according to claim 1, wherein each of the courses of water-resistive material is separately fastened to the inner sheathing member during said fastening step with staples, tacks, nails, or other headed fasteners.

5. A method according to claim 1, further comprising the step of lifting the lower longitudinally-extending edge of one of the courses upward after said covering and fastening steps and before said bonding step, and peeling away release sheets from opposed strips of adhesive on the inner and outer faces to expose the opposed strips of adhesive.

6. A method according to claim 5, wherein said bonding step includes returning the lower longitudinally-extending edge to a position where it confronts and overlaps the opposed upper longitudinally-extending edge of an adjacent course of water-resistive material such that the exposed strips of adhesive are sandwiched between the overlapping courses and form one of the air-tight seams.

7. A method according to claim 1, further comprising a step of installing an exterior covering over the water-resistive sheet material.

* * * * *